United States Patent
Uotani et al.

(10) Patent No.: US 12,540,243 B2
(45) Date of Patent: Feb. 3, 2026

(54) RESIN, METHOD FOR PRODUCING RESIN, CURABLE RESIN COMPOSITION, AND CURED PRODUCT

(71) Applicant: MITSUBISHI GAS CHEMICAL COMPANY, INC., Tokyo (JP)

(72) Inventors: Takuya Uotani, Tokyo (JP); Yoichi Takano, Tokyo (JP); Susumu Innan, Tokyo (JP); Syouichi Itoh, Mie (JP); Satoshi Yoshinaka, Tokyo (JP); Mika Suzuki, Tokyo (JP); Masashi Ogiwara, Okayama (JP); Hiroaki Oka, Okayama (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 519 days.

(21) Appl. No.: 18/018,985

(22) PCT Filed: Jul. 2, 2021

(86) PCT No.: PCT/JP2021/025105
§ 371 (c)(1),
(2) Date: Jan. 31, 2023

(87) PCT Pub. No.: WO2022/034752
PCT Pub. Date: Feb. 17, 2022

(65) Prior Publication Data
US 2023/0312912 A1  Oct. 5, 2023

(30) Foreign Application Priority Data
Aug. 12, 2020  (JP) .................. 2020-136436

(51) Int. Cl.
C08L 65/04 (2006.01)
C08F 299/02 (2006.01)
C08G 8/30 (2006.01)
C08G 10/00 (2006.01)
C08G 59/62 (2006.01)

(52) U.S. Cl.
CPC ............ *C08L 65/04* (2013.01); *C08F 299/02* (2013.01); *C08G 8/30* (2013.01); *C08G 10/00* (2013.01); *C08G 59/62* (2013.01)

(58) Field of Classification Search
None
See application file for complete search history.

(56) References Cited

U.S. PATENT DOCUMENTS 5,385,989 A  1/1995 Ohya
2007/0238850 A1  10/2007 Ogiwara et al.
(Continued)

FOREIGN PATENT DOCUMENTS

CN 101050261 A 10/2007
CN 103732642 A 4/2014
(Continued)

OTHER PUBLICATIONS

Office Action, dated Jan. 28, 2025, issued in corresponding Japanese family member application No. 2022-542596, with English language translation thereof.
(Continued)

*Primary Examiner* — Christopher M Rodd
(74) *Attorney, Agent, or Firm* — GREENBLUM & BERNSTEIN, P.L.C.

(57) ABSTRACT

To provide a novel resin having excellent dielectric properties, a method for producing the resin, a curable resin composition, and a cured product. The resin contains constituent units described in Group (1). $R^1$ each independently represent a methylene group, a methylene oxy group, a methylene oxy methylene group, or an oxy methylene group. $R^2$ and $R^3$ each independently represent a halogen atom, an alkyl group having from 1 to 10 carbons, a halogenated alkyl group having from 1 to 10 carbons, a hydroxy alkyl group having from 1 to 10 carbons, or an aryl group having from 6 to 12 carbons. $R^4$, $R^5$, and $R^6$ each independently represent a hydrogen atom, a halogen atom, an alkyl group having from 1 to 10 carbons, a halogenated alkyl group having from 1 to 10 carbons, a hydroxy group, a hydroxy alkyl group having from 1 to 10 carbons, or an aryl group having from 6 to 12 carbons.

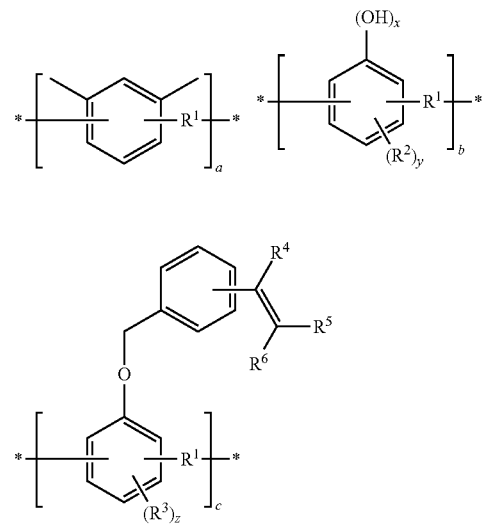

27 Claims, No Drawings

(56) References Cited

U.S. PATENT DOCUMENTS

| | | |
|---|---|---|
| 2014/0308530 A1 | 10/2014 | Sugano et al. |
| 2016/0130384 A1 | 5/2016 | Higashihara et al. |
| 2021/0061996 A1* | 3/2021 | Umehara ................ B32B 15/08 |

FOREIGN PATENT DOCUMENTS

| | | | |
|---|---|---|---|
| CN | 105324401 A | 2/2016 | |
| CN | 108148162 A | 6/2018 | |
| JP | 01-108212 A | 4/1989 | |
| JP | 2003-306591 A | 10/2003 | |
| JP | 2015-189925 A | 11/2015 | |
| JP | 2019-112569 A | 7/2019 | |
| JP | 2019-157015 A | 9/2019 | |
| JP | 2020-037651 A | 3/2020 | |
| TW | 201434953 A | 9/2014 | |
| TW | 201938640 A | 10/2019 | |
| WO | 2014/103926 A1 | 7/2014 | |
| WO | WO-2019130735 A1 * | 7/2019 | ............. B32B 27/00 |
| WO | 2019/176855 A1 | 9/2019 | |

OTHER PUBLICATIONS

International Search Report issued in International Bureau of WIPO Patent Application No. PCT/JP2021/025105, dated Aug. 17, 2021, along with an English translation thereof.

Written Opinion issued in International Bureau of Wipo Patent Application No. PCT/JP2021/025105, dated Aug. 17, 2021, along with an English translation thereof.

International Preliminary Report on Patentability issued in International Bureau of WIPO Patent Application No. PCT/JP2021/025105, dated Feb. 7, 2023, along with an English translation thereof.

Office Action dated May 29, 2025, issued in Chinese family member Patent Application No. 202180056485.4. Note: The document is not in the English language; however, the Office Action's characterization of the cited documents (e.g., "X", "Y", "A", etc., is given in English language characters at the end of the document and the Examiner's consideration of this information on that basis is respectfully requested.

Office Action dated Jun. 18, 2025, issued in Taiwanese family member Patent Application No. 110127993. Note: The document is not in the English language; however, the Office Action's characterization of the cited documents (e.g., "X", "Y", "A", etc., is given in English language characters at the end of the document and the Examiner's consideration of this information on that basis is respectfully requested.

* cited by examiner

RESIN, METHOD FOR PRODUCING RESIN, CURABLE RESIN COMPOSITION, AND CURED PRODUCT

TECHNICAL FIELD

The present invention relates to a novel resin, a method for producing the resin, a curable resin composition, and a cured product.

BACKGROUND ART

A resin containing a vinyl group, such as a vinyl compound, has excellent dielectric properties, thermal resistance, and low hygroscopicity, and thus is used as a raw material for electronic devices dealing with high-frequency signals. As such vinyl compounds and methods for producing thereof, for example, those described in Patent Document 1 and Patent Document 2 have been known.

CITATION LIST

Patent Documents

Patent Document 1: JP 2015-189925 A
Patent Document 2: JP 01-108212 A

SUMMARY OF INVENTION

Technical Problem

In association with recent technological innovation, a novel resin containing a vinyl group achieving excellent dielectric properties and a method for producing the same have been demanded.

The present invention is to solve the problems described above, and an object of the present invention is to provide a novel resin having excellent dielectric properties, a method for producing the resin, a curable resin composition, and a cured product.

Solution to Problem

The inventors of the present invention conducted an examination on the basis of the problems described above, and as a result, found that the problems can be solved by a resin having a predetermined structure.

Specifically, the above issue can be solved by the following means.

<1> A resin containing constituent units described in Group (1):

Group (1)

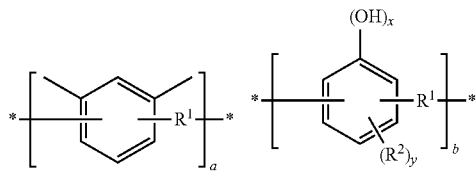

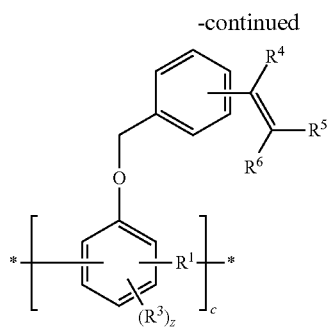

where $R^1$ each independently represent a methylene group, a methylene oxy group, a methylene oxy methylene group, or an oxy methylene group, $R^2$ and $R^3$ each independently represent a halogen atom, an alkyl group having from 1 to 10 carbons, a halogenated alkyl group having from 1 to 10 carbons, a hydroxy alkyl group having from 1 to 10 carbons, or an aryl group having from 6 to 12 carbons. $R^4$, $R^5$, and $R^6$ each independently represent a hydrogen atom, a halogen atom, an alkyl group having from 1 to 10 carbons, a halogenated alkyl group having from 1 to 10 carbons, a hydroxy group, a hydroxy alkyl group having from 1 to 10 carbons, or an aryl group having from 6 to 12 carbons, x represents 0 or 1, and y and z each independently represent a number of 0 to 3, a, b, and c each independently represent a molar ratio of the constituent unit, a represents a number of 1 or greater, b represents a number of 0 or greater, and c represents a number of 1 or greater, $R^1$ may bond each other to form a crosslinking structure, and * represents a bonding position with another constituent unit or a terminal group.

<1> The resin according to <1>, wherein, in Group (1), $R^4$, $R^5$, and $R^6$ each independently represent a hydrogen atom.

<3> The resin according to <1> or <2>, wherein, in Group (1), $R^2$ and $R^3$ each independently represent an alkyl group having from 1 to 10 carbons.

<4> The resin according to <1> or <2>, wherein, in Group (1), $R^2$ and $R^3$ each independently represent an alkyl group having from 1 to 5 carbons.

<5> The resin according to ally one of <1> to <4>, wherein $0.2 \leq a/(b+c) \leq 5$ is satisfied in Group (1).

<6> The resin according to any one of <1> to <5>, wherein the constituent units described in Group (1) contain at least one type selected from the group consisting of constituent units described in Group (1-1), constituent units described in Group (1-2), and constituent units described in Group (1-3):

Group (1-1)

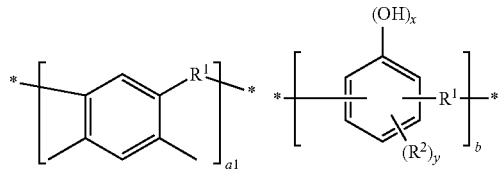

-continued

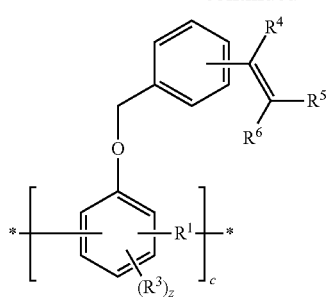

where $R^1$, $R^2$, $R^3$, $R^4$, $R^5$, $R^6$, x, y, z, a1, b, and c are respectively synonymous with $R^1$, $R^2$, $R^3$, $R^4$, $R^5$, $R^6$, x, y, z, a, b, and c of Group (1), and * represents a bonding position with another constituent unit or a terminal group, Group (1-2)

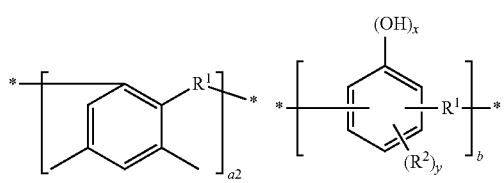

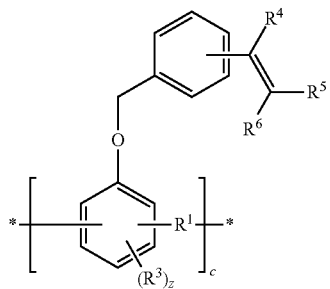

where $R^1$, $R^2$, $R^3$, $R^4$, $R^5$, $R^6$, x, y, z, a2, b, and c are respectively synonymous with $R^1$, $R^2$, $R^3$, $R^4$, $R^5$, $R^6$, x, y, z, a, b, and c of Group (1), and * represents a handing position with another constituent unit or a terminal group, Group (1-3)

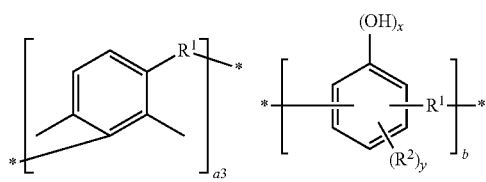

-continued

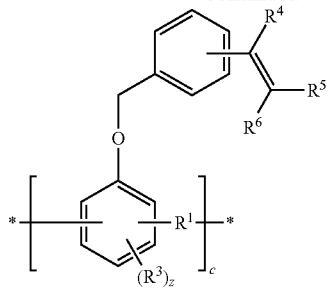

where $R^1$, $R^2$, $R^3$, $R^4$, $R^5$, $R^6$, x, y, z, a3, b, and c are respectively synonymous with $R^1$, $R^2$, $R^3$, $R^4$, $R^5$, $R^6$, x, y, z, a, b, and c of Group (1), and * represents a bonding position with another constituent unit or a terminal group.

<7> The resin according to <6>, wherein the constituent units described in Group (1) contain the constituent units described in Group (1-1).

<8> The resin according to any one of <1> to <7>, wherein a number average molecular weight (Mn) is from 500 to 4000, and a weight average molecular weight (Mw) is from 500 to 7000.

<9> The resin according to any one of <1> to <8>, wherein a terminal group of the resin is selected from the group consisting of a hydrogen atom, a hydroxy group, and a hydroxymethyl group.

<10> A resin being a reaction product of a resin containing constituent units described in Group (2) and a compound represented by Formula (3):

Group (2)

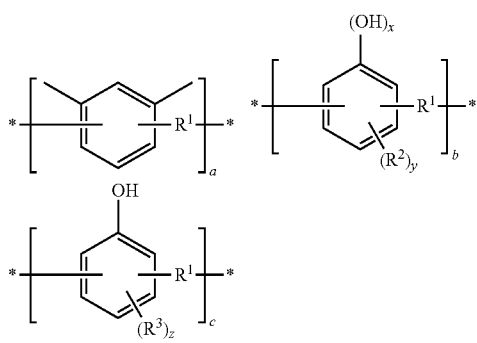

where $R^1$ each independently represent a methylene group, a methylene oxy group, a methylene oxy methylene group, or an oxy methylene group, $R^2$ and $R^3$ each independently represent a halogen atom, an alkyl group having from 1 to 10 carbons, a halogenated alkyl group having from 1 to 10 carbons, a hydroxy alkyl group having from 1 to 10 carbons, or an aryl group having from 6 to 12 carbons, x represents 0 or 1, and y and z each independently represent a number of 0 to 3, a, b, and c each independently represent a molar ratio of the constituent units, a represents a number of 1 or greater, b represents a number of 0 or greater, and c represents a number of 1 or greater, $R^1$ may bond each other to form a crosslinking structure and * represents a bonding position with another constituent unit or a terminal group, Formula (3)

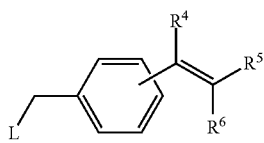

where $R^4$, $R^5$, and $R^6$ each independently represent a hydrogen atom, a halogen atom, an alkyl group having from 1 to 10 carbons, a halogenated alkyl group having from 1 to 10 carbons, a hydroxy group, a hydroxy alkyl group having, from 1 to 10 carbons, or an aryl group having from 6 to 12 carbons, and L represents a halogen atom.

<0.11> The resin according to <10>, wherein a hydroxy group equivalent of the resin containing the constituent units described in Group (2) is from 200 to 400 g/eq.

<12> A method for producing a resin, the method comprising reacting a resin containing constituent units described in Group (2) and a compound represented by Formula (3) in the presence of a basic compound:

Group (2)

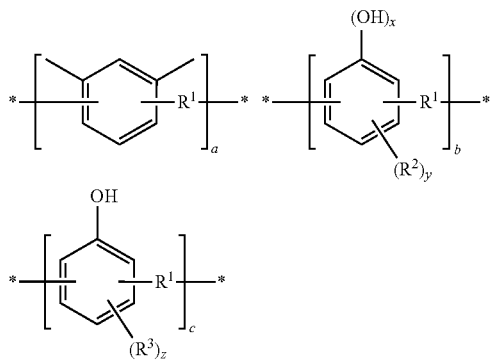

where $R^1$ each independently represent a methylene group, a methylene oxy group, a methylene oxy methylene group, or an oxy methylene group, $R^2$ and $R^3$ each independently represent a halogen atom, an alkyl group having from 1 to 10 carbons, a halogenated alkyl group having from 1 to 10 carbons, a hydroxy alkyl group having from 1 to 10 carbons, or an aryl group having from 6 to 12 carbons, x represents 0 or 1, and y and z each independently represent a number of 0 to 3, a, b, and c each independently represent a molar ratio of the constituent units, a represents a number of 1 or greater, b represents a number of 0 or greater, and c represents a number of 1 or greater, $R^1$ may bond each other to form a crosslinking structure, and * represents a bonding position with another constituent unit or a terminal group, Formula (3)

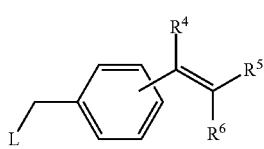

where $R^4$, $R^5$, and $R^6$ each independently represent a hydrogen atom, a halogen atom, an alkyl group having from 1 to 10 carbons, a halogenated alkyl group having from 1 to 10 carbons, a hydroxy group, a hydroxy alkyl group having from 1 to 10 carbons, or an and group having from 6 to 12 carbons, and L represents a halogen atom.

<13> The method according to <12>, wherein, in Formula (3), $R^4$, $R^5$, and $R^6$ are each a hydrogen atom, and L is a chlorine atom.

<14> The method according to <12≥ or <13>, wherein, in Group (2), $R^2$ and $R^3$ each independently represent an alkyl group having from 1 to 10 carbons.

<15> The method according to <12> or <13>, wherein, in Group (2), $R^2$ and $R^3$ each independently represent an alkyl group having from 1 to 5 carbons.

<16> The method according to any one of <12> to <15>, wherein $0.2 \leq a/(b+c) \leq 5$ is satisfied in Group (2).

<17> The method according to any one of <12> to <16>, wherein the constituent units described in Group (2) contains at least one type of constituent units described in Group (2-1), constituent units described in Group (2-2), or constituent units describe in Group (2-3):

Group (2-1)

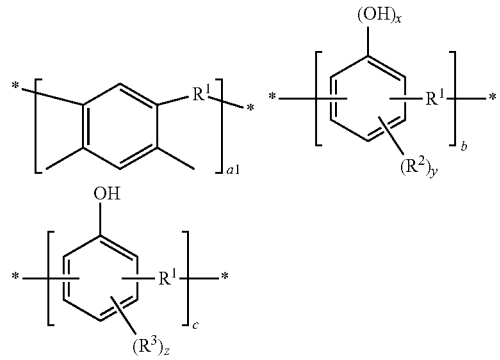

where $R^1$, $R^2$, $R^3$, x, y, z, a1, b, and c are respectively synonymous with $R^1$, $R^2$, $R^3$, x, y, z, a, b, and c of Group (2), and * represents a bonding position with another constituent unit or a terminal group, Group (2-2)

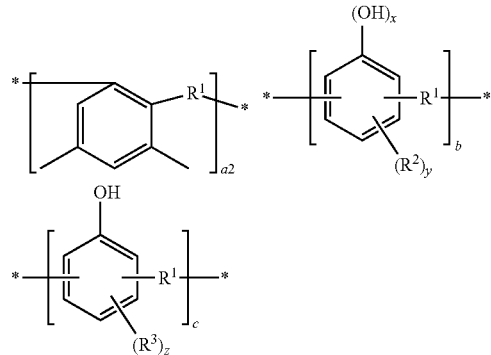

where $R^1$, $R^2$, $R^3$, x, y, z, a2, b, and c are respectively synonymous with $R^1$, $R^2$, $R^3$, x, y, z, a, b, and c of Group (2), and * represents a bonding position with another constituent unit or a terminal group, Group (2-3)

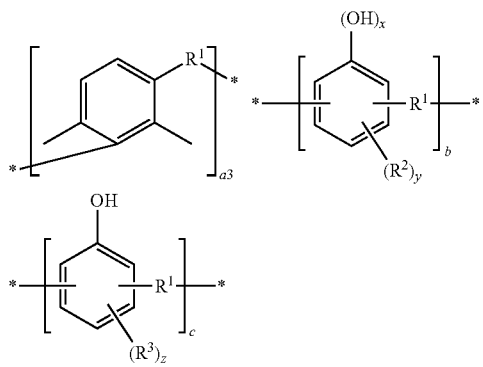

where $R^1$, $R^2$, $R^3$, x, y, z, a3, b, and c are respectively synonymous with $R^1$, $R^2$, $R^3$, x, y, z, a, b, and c of Group (2), and * represents a bonding position with another constituent unit or a terminal group.

<18> The method according to <17>, wherein the constituent units described in Group (2) contain the constituent units described in Group (2-1).

<19> The method according in any one of <12> to <18>, wherein a hydroxy group equivalent of the resin containing the constituent, units described in Group (2) is from 200 to 400 g/eq.

<20> The method according to any one of <12> to <19>, wherein a number average molecular weight Mn of the resin containing the constituent units described in Group (2) is from 400 to 2500, and a weight average molecular weight Mw is from 400 to 5000.

<21> The method according to any one of <12> to <20>, wherein a terminal group of the resin containing the constituent units described in Group (2) is selected from the group consisting of a hydrogen atom, a hydroxy group, and a hydroxymethyl group.

<22> The method according to any one of <12> to <21=, wherein the basic compound contains at least one type selected from the group consisting of alkali metal alkoxides and alkali metal hydroxides.

<23> The method according to any one of <12> to <22>, wherein the produced resin is the resin according to any one of <1> to <11>.

<24> A curable resin composition comprising the resin according to any one of <1> to <11>.

<25> The curable resin composition according to <24>, further comprising a thermosetting compound besides the resin according to any one of <1> to <11>.

<26> The curable resin composition according to <25>, wherein the thermosetting compound contains at least one type selected from the group consisting of compounds having a carbon-carbon unsaturated bonding group and epoxy resins other than the resin according to any one of <1> to <11>.

<27> A cured product of the curable resin composition according to any one of <24> to <26>.

Advantageous Effects of Invention

According to the present invention, a novel resin having excellent dielectric properties, a method for producing the resin, a curable resin composition, and a cured product can be provided.

DESCRIPTION OF EMBODIMENTS

Hereinafter, embodiments for carrying out the present invention (referred to simply as "the present embodiment" below) will be described in detail. Note that the following present embodiments are examples for describing the present invention, and the present invention is not limited to the present embodiments.

In the present description, "from . . . to . . . " or "of . . . to . . . " is used to mean that the numerical values described before and after "to" are included as the lower limit and the upper limit, respectively.

In the present description, various physical property values and characteristic values are at 23° C. unless otherwise noted.

In a description of a group (atomic group) in the present specification, a description not specifying whether the group is a substituted group or an unsubstituted group is meant to include a group (atomic group) having a substituent as well as a group (atomic group) having no substituent. For example, an "alkyl group" includes not only an alkyl group having no substituent (unsubstituted alkyl group) but also an alkyl group having a substituent (substituted alkyl group). In the present specification, a description not specifying whether the group is a substituted group or an unsubstituted group means that the group is preferably an unsubstituted group.

The resin of the present embodiment is characterized by being a resin having the constituent units described in Group (1):

Group (1)

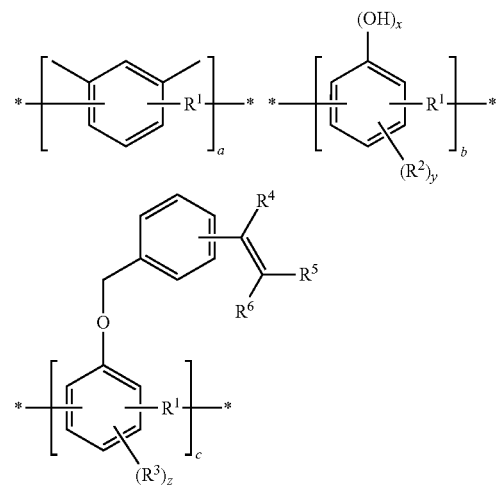

where $R^1$ each independently represent a methylene group, a methylene oxy group, a methylene oxy methylene group, or an oxy methylene group, $R^2$ and $R^3$ each independently represent a halogen atom, an alkyl group having from 1 to 10 carbons, a halogenated alkyl group having from 1 to 10 carbons, a hydroxy alkyl group having from 1 to 10 carbons, or an aryl group having from 6 to 12 carbons, $R^4$, $R^5$, and $R^6$ each independently represent a hydrogen atom, a halogen atom, an alkyl group having from 1 to 10 carbons, a halogenated alkyl group having from 1 to 10 carbons, a hydroxy group, a hydroxy alkyl group having from 1 to 10 carbons, or an aryl group having from 6 to 12 carbons, x represents 0 or 1, and y and z each independently represent a number of 0 to 3, a, b, and c each independently represent a molar ratio of the constituent units, a represents a number of 1 or greater, b represents a number of 0 or greater, and c represents a number of 1 or greater, $R^1$ may bond each other to form a crosslinking structure, and * represents a bonding position with another constituent unit or a terminal group.

Through such a configuration, a resin having excellent dielectric properties can be provided. Furthermore, thermal resistance can be maintained high.

In Group (1), $R^1$ each independently represent a methylene group, a methylene oxy group, a methylene oxy methylene group, or an oxy methylene group, and are preferably a methylene group or a methylene oxy methylene group, and more preferably a methylene group. $R^1$ may bond each other to form a crosslinking structure. Examples of the structure in which $R^1$ are crosslinked include the following structure.

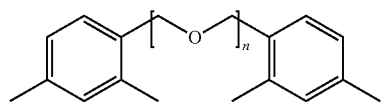

$R^1$ preferably does not form a crosslinking structure. n is a number of 1 or greater and is typically from 1 to 10.

$R^2$ and $R^3$ each independently represent a halogen atom, an alkyl group having from 1 to 10 carbons, a halogenated alkyl group having from 1 to 10 carbons, a hydroxy alkyl group having from 1 to 10 carbons, or an aryl group having from 6 to 12 carbons, and are preferably each independently an alkyl group having from 1 to 10 carbons.

The halogen atom as $R^2$ and $R^3$ is preferably a fluorine atom or a chlorine atom.

The alkyl group having from 1 to 10 carbons as $R^2$ and $R^3$ is more preferably an alkyl group having from 1 to 5 carbons, and even more preferably a methyl group, an ethyl group, an i-propyl group, an n-propyl group, an n-butyl group, or a t-butyl group.

The halogenated alkyl group having from 1 to 10 carbons as $R^2$ and $R^3$ is more preferably an alkyl group having from 1 to 5 carbons and substituted by a fluorine atom or a chlorine atom, and even more preferably a fluoromethyl group, a chloromethyl group, a fluoroethyl group, or a chloroethyl group.

The hydroxy alkyl group having from 1 to 10 carbons as $R^2$ and $R^3$ is more preferably a hydroxy alkyl group having from 1 to 5 carbons, and even more preferably a hydroxymethyl group or a hydroxyethyl group.

The aryl group having from 6 to 12 carbons as $R^2$ and $R^3$ is preferably a phenyl group.

$R^4$, $R^5$, and $R^6$ each independently represent a hydrogen atom, a halogen atom, an alkyl group having from 1 to 10 carbons, a halogenated alkyl group having from 1 to 10 carbons, a hydroxy group, a hydroxy alkyl group having from 1 to 10 carbons, or an aryl group having from 6 to 12 carbons, and are each independently preferably a hydrogen atom, a halogen atom (preferably a chlorine atom or a fluorine atom), or a methyl group, and each independently more preferably a hydrogen atom.

x represents 0 or 1. Both of a constituent unit in which x is 0 and a constituent unit in which x is 1 may be contained, and at least the constituent unit in which x is 0 is preferably contained. Furthermore, there is also an aspect in which at least the constituent unit in which x is 1 is contained.

y and z each independently represent a number of 0 to 3. y and z are each independently preferably 1 or greater and preferably 2 or less. By setting y and z to be 1 or greater, better dielectric properties are achieved.

An aspect in which, in Group (1), $R^1$ is a methylene group, $R^2$ and $R^3$ are each independently a t-butyl group or a methyl group, $R^4$, $R^5$, and $R^6$ are each a hydrogen atom, x is 1, and y and z are each 1 or 2 is preferred.

a, b, and c each independently represent a molar ratio of the constituent units. a represents a number of 1 or greater, b represents a number of 0 or greater, and c represents a number of 1 or greater. The molar ratio of b:a is preferably 1:11 or greater, and more preferably 1:23 or greater. Furthermore, the molar ratio of c:a is preferably 1:0.2 to 5, and more preferably 1:0.25 to 3. Furthermore, the molar ratio of b:c is preferably 1:18 or greater, and more preferably 1:37 or greater.

When the total constituent units in the present embodiment is 100, the sum of a, b, and c, in terms of mole fraction, is preferably 90 or greater, more preferably 95 or greater, and even more preferably the total constituent units except terminal groups being 100.

The constituent units described in Group (1) preferably contain at least one type selected from the group consisting of constituent units described in Group (1-1), constituent units described in Group (1-2), and constituent units described in Group (1-3), and more preferably contain the constituent units described in Group (1-1).

The resin of the present embodiment can be suitably synthesized from a resin having the constituent units described in Group (2) as described below, a representative example of the resin having the constituent units described in Group (2) is a xylene resin which is a low cost resin that can be synthesized from xylene and formaldehyde. When the resin of the present embodiment is produced by using the xylene resin, a resin containing at least one type of the constituent units described in Group (1-1), the constituent units described in Group (1-2), or the constituent units described in Group (1-3) is produced and, particularly, a resin containing the constituent units described in Group (1-1) is preferentially produced. That is, forming the resin containing at least one type of the constituent units described in Group (1-1), the constituent units described in Group (1-2), or the constituent units described in Group (1-3) enables a resin that can be immediately used practically and that can easily produce the resin of the present embodiment industrially at a low cost.

Group (1-1)

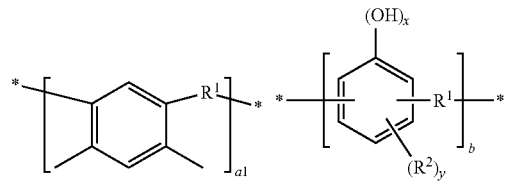

-continued

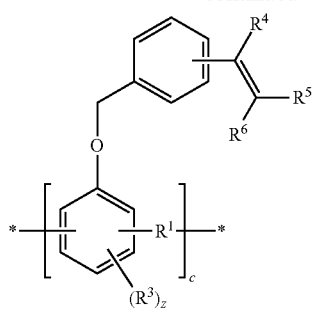

where $R^1$, $R^2$, $R^3$, $R^4$, $R^5$, $R^6$, x, y, z, a1, b, and c are respectively synonymous with $R^1$, $R^2$, $R^3$, $R^4$, $R^5$, $R^6$, x, y, z, a, b, and c of Group (1), * represents a bonding position with another constituent unit or a terminal group, Group (1-2)

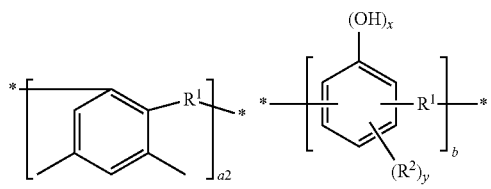

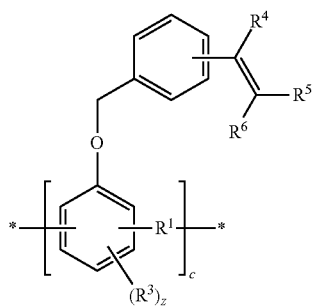

where $R^1$, $R^2$, $R^3$, $R^4$, $R^5$, $R^6$, x, y, z, a2, b, and c are respectively synonymous with $R^1$, $R^2$, $R^3$, $R^4$, $R^5$, $R^6$, x, y, z, a, b, and c of Group (1), and * represents a bonding position with another constituent unit or a terminal group, Group (2-3)

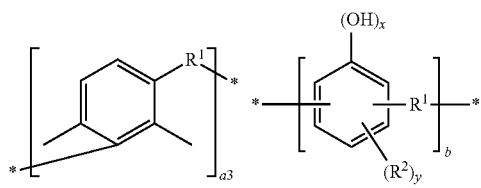

-continued

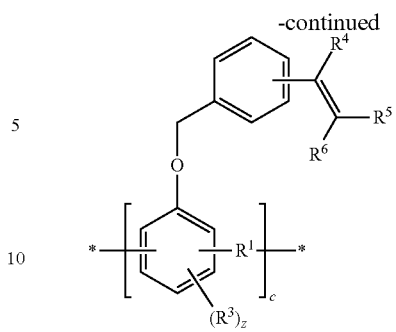

where $R^1$, $R^2$, $R^3$, $R^4$, $R^5$, $R^6$, x, y, z, a3, b, and c are respectively synonymous with $R^1$, $R^2$, $R^3$, $R^4$, $R^5$, $R^6$, x, y, z, a, b, and c of Group (1), * represents a bonding position with another constituent unit or a terminal group.

The resin of the present embodiment may contain only one type of the constituent units of Group (1), or may contain two or more types thereof. When two or more types thereof are contained, the total amount is in the above range.

The resin of the present embodiment may contain a constituent unit other than the constituent units described in Group (1).

Furthermore, in the resin of the present embodiment, the constituent units described in Group (1) may be random-polymerized or block-polymerized.

In Group (1), * represents a bonding position with another constituent unit or a terminal group. The terminal group is preferably selected from a hydrogen atom, a hydroxy group, or a hydroxymethyl group, more preferably a hydrogen atom or a hydroxy group, and even more preferably a hydrogen atom.

The resin of the present embodiment preferably satisfies $0.2 \leq a/(b+c) \leq 5$ in Group (1). When the value is not lower than the lower limit, thermal deterioration over time tends to be more effectively suppressed. Furthermore, when the value is nut higher than the upper limit, glass transition temperature tends to be increased higher, $a/(b+c)$ is more preferably 0.2 or greater, even more preferably 0.23 or greater, yet even more preferably 0.27 or greater, and yet even more preferably 0.3 or greater. Furthermore, $a/(b+c)$ is more preferably 5 or less, even more preferably 4 or less, yet even more preferably 3 or less, yet even more preferably 2.5 or less, and yet even more preferably 2.3 or less. The value of $a/(b+c)$ can be determined based on the value of $a/(b+c)$ in Group (2) described below.

In the resin of the present embodiment, the weight average molecular weight (Mw) is preferably 500 or greater, more preferably 600 or greater, even more preferably 800 or greater, yet even more preferably 1000 or greater, and yet even more preferably 2000 or greater. When the weight average molecular weight is not lower than the lower limit, toughness and flexibility of the resin increase, and breakage during forming and occurrence of cracking of a molded article can be more effectively suppressed. Furthermore, in the resin of the present embodiment, the weight average molecular weight (Mw) is preferably 7000 or less, more preferably 6000 or less, even more preferably 5000 or less, yet even more preferably 4000 or less, and yet even more preferably 3500 or less. When the weight average molecular weight is not higher than the upper limit, handling of the resin tends to be further enhanced due to enhancement of solvent solubility of the resin and decrease in the melt viscosity of the resin.

In the resin of the present embodiment, the number average molecular weight (Mn) is preferably 500 or greater, more preferably 600 or greater, even more preferably 700 or greater, yet even more preferably 800 or greater, and yet even more preferably 900 or greater. When the number average molecular weight is not lower than the lower limit, toughness and flexibility of the resin increase, and breakage during forming and occurrence of cracking of a molded article can be more effectively suppressed. Furthermore, in the resin of the present embodiment, the number average molecular weight (Mn) is preferably 4000 or less, more preferably 3500 or less, even more preferably 3000 or less, yet even more preferably 2000 or less, and yet even more preferably 1500 or less. When the number average molecular weight is not higher than the upper limit, handling of the resin tends to be further enhanced due to enhancement of solvent solubility of the resin and decrease in the melt viscosity of the resin.

The weight average molecular weight and the number average molecular weight are measured in accordance with methods described in Examples below.

The resin production method of the present embodiment includes reacting a resin containing constituent units described in Group (2) and a compound represented by Formula (3) in the presence of a basic compound. By such a production method, a resin having excellent dielectric properties can be produced. Furthermore, a resin having excellent thermal resistance can be produced.

Group (2)

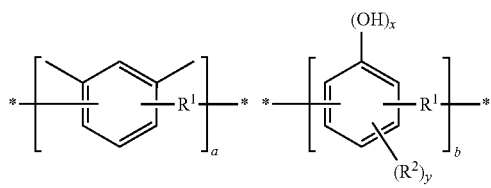

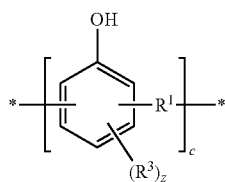

where $R^1$ each independently represent a methylene group, a methylene oxy group, a methylene oxy methylene group, or an oxy methylene group, $R^2$ and $R^3$ each independently represent a halogen atom, an alkyl group having from 1 to 10 carbons, a halogenated alkyl group having from 1 to 10 carbons, a hydroxy alkyl group having from 1 to 10 carbons, or an aryl group having from 6 to 12 carbons, x represents 0 or 1, and y and z each independently represent a number of 0 to 3, a, b, and c each independently represent a molar ratio of the constituent units, a represents a number of 1 or greater, b represents a number of 0 or greater, and c represents a number of 1 or greater, $R^1$ may bond each other to form a crosslinking structure, and * represents a bonding position with another constituent unit or a terminal group.

Formula (3)

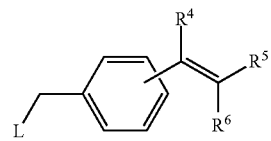

where $R^4$, $R^5$, and $R^6$ each independently represent a hydrogen atom, a halogen atom, an alkyl group having from 1 to 10 carbons, a halogenated alkyl group having from 1 to 10 carbons, a hydroxy group, a hydroxy alkyl group having from 1 to 10 carbons, or an aryl group having from 6 to 12 carbons, and L represents a halogen atom.

First, details of Group (2) are described.

In Group (2), $R^1$, $R^2$, $R^3$, x, y, z, a, b, and c are respectively synonymous with $R^1$, $R^2$, $R^3$, x, y, z, a, b, and c of Group (1), and the preferred ranges are the same or similar. The terminal group in Group (2) is the same or similar as the term mat group in Group (1). The preferred range of a/(b+c) in Group (2) is also synonymous with the preferred range of a/(b+c) in Group (1). a/(b+c) in Group (2) is calculated based on a hydroxyl value of the produced resin.

Furthermore, the constituent units described in Group (2) preferably contain at least one type selected from the group consisting of constituent units described in Group (2-1), constituent units described in Group (2-2), and constituent units described in Group (2-3), and more preferably contain the constituent units described in Group (2-1). By using a resin containing at least one type selected from the group consisting of the constituent units described in Group (2-1), the constituent units described in Group (2-2), and the constituent units described in Group (2-3), a resin containing the constituent units described in Group (1) can be produced at a lower cost.

Group (2-1)

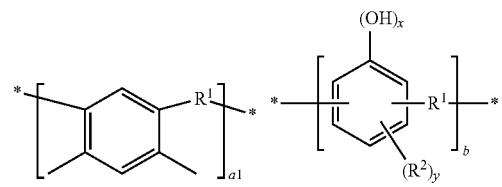

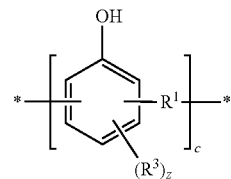

where $R^1$, $R^2$, $R^3$, x, y, z, a1, b, and c are respectively synonymous with $R^1$, $R^2$, $R^3$, x, y, z, a, b, and c of Group (2), and * represents a bonding position with another constituent unit or a terminal group, Group (2-2)

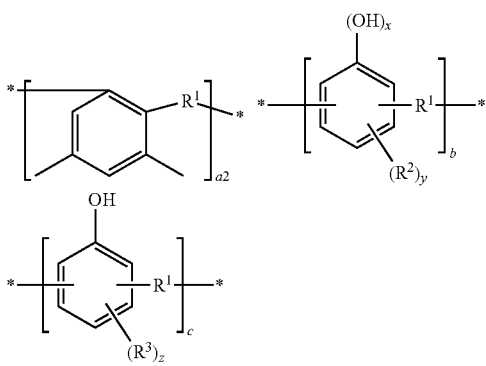

where $R^1$, $R^2$, $R^3$, x, y, z, a2, b, and c are respectively synonymous with $R^1$, $R^2$, $R^3$, x, y, z, a, b, and c of Group (2), and * represents a bonding position with mother constituent unit or a terminal group.

Group (2-3)

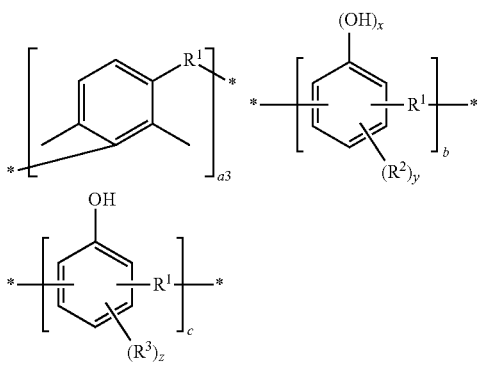

where $R^1$, $R^2$, $R^3$, x, y, z, a3, b, and c are respectively synonymous with $R^1$, $R^2$, $R^3$, x, y, z, a, b, and c of Group (2), and * represents a bonding position with another constituent unit or a terminal group.

In the resin containing the constituent units described in Group (2), the weight average molecular weight (Mw) is preferably 400 or greater, more preferably 600 or greater, even more preferably 700 or greater, yet even more preferably 800 or greater, yet even more preferably 850 or greater, and yet even more preferably 900 or greater, and may be 1000 or greater. When the weight average molecular weight is not lower than the lower limit, toughness and flexibility of the resin increase, and breakage during forming and occurrence of cracking of a molded article can be more effectively suppressed. Furthermore, in the resin containing the constituent units described in Group (2), the weight average molecular weight (Mw) is preferably 5000 or less, more preferably 4000 or less, even more preferably 3500 or less, yet even more preferably 3000 or less, and yet even more preferably 2500 or less. When the weight average molecular weight is not higher than the upper limit, handling of the resin tends to be further enhanced due to enhancement of solvent solubility of the resin and decrease in the melt viscosity of the resin.

In the resin containing the constituent units described in Group (2), the number average molecular weight (Mn) is preferably 400 or greater, more preferably 450 or greater, even more preferably 500 or greater, and yet even more preferably 600 or greater. When the number average molecular weight is not lower than the lower limit, toughness and flexibility of the resin increase, and breakage during forming and occurrence of cracking of a molded article can be more effectively suppressed. Furthermore, in the resin containing the constituent units described in Group (2), the number average molecular weight (Mn) is preferably 2500 or less, more preferably 2000 or less, even more preferably 1500 or less, and yet even more preferably 1000 or less. When the number average molecular weight is not higher than the upper limit, handling of the resin tends to be further enhanced due to enhancement of solvent solubility of the resin and decrease in the melt viscosity of the resin.

The weight average molecular weight and the number average molecular weight are measured in accordance with methods described in Examples below.

In the resin containing the constituent units described in Group (2), the hydroxy group equivalent is preferably 200 g/eq or greater, more preferably 250 g/eq or greater, even more preferably 270 g/eq or greater, yet even more preferably 280 g/eq or greater, and yet even more preferably 290 g/eq or greater, and may be 300 g/eq or greater, or 320 g/eq or greater. When the hydroxy group equivalent is not lower than the lower limit, the amount of hydroxy groups reacted with the compound represented by Formula (3) does not become greater than the amount needed, and the change percentage of dielectric loss tangent due to thermal deterioration can be effectively made small. In the resin containing the constituent units described in Group (2), the hydroxy group equivalent is preferably 400 g/eq or less, more preferably 395 g/eq or less, even more preferably 390 g/eq or less, yet even more preferably 385 g/eq or less, and yet even more preferably 380 g/eq or less, and may be 370 g/eq or less, or 360 g/eq or less. When the hydroxy group equivalent is not higher than the upper limit, a resin having excellent thermal resistance and excellent dielectric properties tends to be produced.

That is, by introduction of the structure derived from the compound represented by Formula (3) such as a vinylbenzyl group, the resulting resin has a high Tg and excellent dielectric properties and thus is preferred but tends to cause thermal deterioration over time. In a case of the use for purpose requiring suppression of thermal deterioration over time, the amount of the hydroxy group of the raw material is preferably adjusted as described above.

The hydroxy group equivalent is measured in accordance with description in Examples.

Details of Formula (3) are described.

Formula (3)

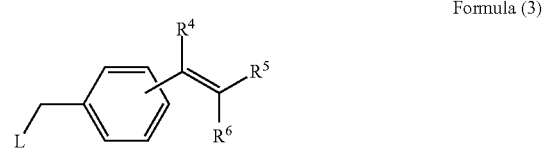

where $R^4$, $R^5$, and $R^6$ each independently represent a hydrogen atom, a halogen atom, an alkyl group having from 1 to 10 carbons, a halogenated alkyl group having from 1 to 10 carbons, a hydroxy group, a hydroxy alkyl group having from 1 to 10 carbons, or an aryl group having from 6 to 12 carbons, and L represents a halogen atom.

In Formula (3), $R^4$, $R^5$, and $R^6$ are respectively synonymous with $R^4$, $R^5$, and $R^6$ in Formula (1), and the preferred ranges are the same or similar.

In Formula (3), L represents a halogen atom, and is preferably a fluorine atom or a chlorine atom, and more preferably a chlorine atom.

In the resin production method of the present embodiment, one type each of the resin containing the constituent units described in Group (2) and the compound represented by Formula (3) may be used, or two or more types each thereof may be used.

In the resin production method of the present embodiment, the molar ratio of the phenolic hydroxy group of the resin containing the constituent units described in Group (2) that is added to the reaction system to the compound represented by Formula (3) is preferably from 1:1 to 1.3, and more preferably from 1:1 to 1.2.

In the resin production method of the present embodiment, the resin containing the constituent units described in Group (2) above and the compound represented by Formula (3) are reacted in the presence of a basic compound. By use of the basic compound, reaction between the phenolic hydroxy group of the resin containing the constituent units described in Group (2) above and the halogenated methyl group of the compound represented by Formula (3) is promoted.

The basic compound preferably contains at least one type selected from the group consisting of alkali metal alkoxides and alkali metal hydroxides, and more preferably contains an alkali metal hydroxide. Examples of the alkali metal include lithium, potassium, and sodium, and the alkali metal is preferably sodium. Examples of the alkoxide constituting the alkali metal alkoxide include methoxide and ethoxide.

In the production method of the present embodiment, the molar ratio of the phenolic hydroxy group of the resin containing the constituent units described in Group (2) to the total amount of the alkali metal alkoxide and the alkali metal hydroxide added to the reaction system is preferably from 1:1 to 1:6, and more preferably from 1:1.1 to 1:4.

In the production method of the present embodiment, when the alkali metal hydroxide is used, a phase-transfer catalyst may be used in combination. Examples of the phase-transfer catalyst include tetrabutylammonium bromide.

In the production method of the present embodiment, the basic compound (especially, an alkali metal alkoxide and an alkali metal hydroxide) may be added to the reaction system in a batch or may be added as two or more separate parts, and is preferably added as two or more separate parts. By the addition in two or more separate parts, the reaction rate tends to be further enhanced.

In the production method of the present embodiment, the reaction of the resin containing the constituent units described in Group (2) and the compound represented by Formula (3) is preferably performed at 40 to 100° C., and more preferably at 50 to 85° C.

In the production method of the present embodiment, a solvent is preferably used for the reaction of the resin containing the constituent units described in Group (2) above and the compound represented by Formula (3).

The solvent can be appropriately selected based on the type of the basic compound to be used.

When an alkali metal hydroxide is used as the basic compound, examples of the solvent include aromatic hydrocarbon (preferably toluene) and water. More specifically, an aromatic hydrocarbon and an aqueous solution of an alkali metal hydroxide is preferably added to the reaction system and used.

When an alkali metal alkoxide is used as the basic compound, the solvent is preferably an aprotic polar solvent.

In the production method of the present embodiment, the resin yielded after the reaction of the resin containing the constituent units described in Group (2) above and the compound represented by Formula (3) is preferably separated and purified. The separation purification can be performed in accordance with a common method.

A resin produced by the resin production method of the present embodiment is preferably the resin of the present embodiment described above. Thus, the weight average molecular weight (Mw) and the number average molecular weight (Mn) of the resin produced by the resin production method of the present embodiment are preferably in the same ranges as the weight average molecular weight (Mw) and the number average molecular weight (Mn) of the resin of the present embodiment described above, respectively.

Applications

The resin of the present embodiment can be used as a curable resin composition. The curable resin composition may contain only one type or two or more types of resins of the present embodiments and may further contain a thermosetting compound other than the resins of the present embodiments. The thermosetting compound preferably contains at least one type selected from the group consisting of compounds having a carbon-carbon unsaturated bonding group, which are compounds other than the resin of the present embodiment, and epoxy resins.

Furthermore, the curable resin composition may contain one type or two or more types of various additives. Examples of the additive include flame retardants, ultraviolet absorbers, antioxidants, photopolymerization initiators, fluorescent whitening agents, photosensitizers, dyes, pigments, thickeners, flow control agents, lubricants, defoamers, dispersants, leveling agents, brighteners, and polymerization inhibitors.

The cured product of the present embodiment is a cured product produced by curing the curable resin composition described above. Because such a cured product has excellent thermal resistance and excellent dielectric properties, the cured product can be suitably used as an insulating layer of a printed wiring board or a material for a semiconductor package.

EXAMPLES

The present invention will be described more specifically with reference to examples below. Materials, amounts used, proportions, processing details, processing procedures, and the like described in the following examples can be appropriately changed as long as they do not depart from the spirit of the present invention. Thus, the scope of the present invention is not limited to the specific examples described below.

If a measuring device used in the examples is not readily available due to discontinuation or the like, another device with equivalent performance can be used for measurement.

Measurement of Number Average Molecular Weight and Weight Average Molecular Weight The number average molecular weight and the weight average molecular weight of the resin were determined by gel permeation chromatography (GPC).

As analytical columns, KF-801, KF-802, KF-803, and KF-804, available from Showa Denko K.K., were connected and used, and the differential refractive index detector RID-20A, available from Shimadzu Corporation, was used for detection. In 2 mL of tetrahydrofuran as an eluent, 80 mg of a resin (xylene resin, vinyl compound) as a measurement target was dissolved, and the analysis was performed by setting the injection amount into the columns to 20 μL, the eluent flow rate at 1 mL/min, and the column temperature at 40° C. By Standard Polystyrene Kit PStQuick MP-N, available from Tosoh Corporation, a molecular weight calibration curve was created, and the molecular weight calibrated with polystyrene was estimated.

Measurement of Hydroxy Group Equivalent of Raw Material Resin

The hydroxy group equivalent of the raw material phenol-modified xylene resin was measured in accordance with JIS K0070-92-7.1.

Measurement of Hydroxy Group Equivalent of Resin (Vinyl Compound)

The hydroxy group equivalent of the resin (vinyl compound) was determined by performing IR analysis (liquid cell method; cell length=1 mm) using 2,6-dimethylphenol (2,6-xylenol) as a reference material and dry dichloromethane as a solvent, and the hydroxy group equivalent was determined based on absorption intensity at 3600 cm$^{-1}$.

Used instrument: Nicolet 6700 FT-IR

Analysis of $^1$H-NMR

For the resin (vinyl compound), $^1$H-NMR analysis found that the peak of benzyl position around 4.70 ppm and the peaks of vinyl position around 5.25 ppm and 5.75 ppm appeared after the reaction, and IR analysis found that the peak around 3600 cm$^{-1}$ of the phenolic hydroxy group of the xylene resin modified by phenols disappeared from the vinyl compound.

Used instrument: 500 MHz NMR AVANCE III HD, available from Bruker

Synthesis Example 1 Synthesis of
p-tert-Butylphenol (PTBP)-Modified Xylene Resin In a 0.5 L separable flask equipped with a thermometer, a Liebig condenser, a stirrer, and a water vapor introduction tube, 300.0 g of xylene formaldehyde resin (NIKANOL G, product of Fudow Co., Ltd.) and 0.16 g (0.84 mmol) of p-toluenesulfonic acid monohydrate (product of FUJIFILM Wako Pure Chemical Corporation) were charged, and the temperature was increased to 180° C. in a water vapor stream while the mixture was stirred. The mixture was stirred at the same temperature for 2 hours, and thus acetal was removed from the xylene formaldehyde resin. The formed formaldehyde was distilled out of the system. After the removal of acetal, 200.0 g (1.33 mol) of p-tert-butylphenol (product of DIC Corporation) was added and allowed to react at 180° C. for 2 hours while dehydration was performed. After the reaction, 0.16 g (2.66 mmol) of urea was added to terminate the reaction. After the termination of the reaction, unreacted p-tert-butylphenol was distilled out by increasing the temperature to 230° C. in a water vapor stream, and thus 409.6 g of brown solid p-tert-butylphenol-modified xylene formaldehyde resin was obtained. The number average molecular weight of the obtained resin was 962, the weight average molecular weight was 2112, and the hydroxy group equivalent was 346 g/eq.

Synthesis Example 2 Synthesis of
2,6-Xylenol-Modified Xylene Resin (1)

In a 0.5 L separable flask equipped with a thermometer, a Liebig condenser, a stirrer, and a water vapor introduction tube, 300.0 g of xylene formaldehyde resin (NIKANOL G, product of Fudow Co., Ltd.), 0.84 g (8.57 mmol) of maleic anhydride, and 0.14 g (0.74 mmol) of p-toluenesulfonic acid monohydrate (product of FUJIFILM Wako Pure Chemical Corporation) were charged, and the temperature was increased to 180° C. in a water vapor stream while the mixture was stirred. The mixture was stirred at the same temperature for 2 hours, and thus acetal was removed from the xylene formaldehyde resin. The formed formaldehyde was distilled out of the system. After the removal of acetal, 150.0 g (1.23 mol) of 2,6-xylenol (product of Mitsubishi Gas Chemical Company, Inc.) was added, and the temperature was increased to 200° C. while dehydration was performed, and the mixture was allowed to react at the same temperature for 2 hours. After the reaction, 0.13 g (2.16 mmol) of urea was added to terminate the reaction. After the termination of the reaction, unreacted 2,6-xylenol was distilled out by increasing the temperature to 230° C. in a water vapor stream, and thus 365.7 g of brown solid 2,6-xylenol-modified xylene formaldehyde resin was obtained. The number average molecular weight of the obtained resin was 796, the weight average molecular weight was 1929, and the hydroxy group equivalent was 373 g/eq.

Synthesis Example 3 Synthesis of
2,6-Xylenol-Modified Xylene Resin (2)

In a 0.5 L separable flask equipped with a thermometer, a Liebig condenser, a stirrer, and a water vapor introduction tube, 300.0 g of xylene formaldehyde resin (NIKANOL G, product of Fudow Co., Ltd.), 0.84 g (8.57 mmol) of maleic anhydride, and 0.16 g (0.84 mmol) of p-toluenesulfonic acid monohydrate (product of FUJIFILM Wako Pure Chemical Corporation) were charged, and the temperature was increased to 180° C. in a water vapor stream while the mixture was stirred. The mixture was stirred at the same temperature for 2 hours, and thus acetal was removed from the xylene formaldehyde resin. The formed formaldehyde was distilled out of the system. After the removal of acetal, 220.6 g (1.81 mol) of 2,6-xylenol (product of Mitsubishi Gas Chemical Company, Inc.) was added, and the temperature was increased to 200° C. while dehydration was performed. The mixture was allowed to react at the same temperature for 2 hours. After the reaction, 0.16 g (2.66 mmol) of urea was added to terminate the reaction. After the termination of the reaction, unreacted 2,6-xylenol was distilled out by increasing the temperature to 230° C. in a water vapor stream, and thus 405.8 g of brown solid 2,6-xylenol-modified xylene formaldehyde resin was obtained. The number average molecular weight of the obtained resin was 557, the weight average molecular weight was 900, and the hydroxy group equivalent was 289 g/eq.

Example 1

In a 300 mL four-neck flask equipped with a stirring apparatus, a thermometer, and a reflux condenser, in a nitrogen atmosphere, 30.2 g (87.2 mmol in terms of the number of moles of hydroxy group) of p-tert-butylphenol-modified xylene resin obtained in Synthesis Example 1, 120.6 g of N,N-dimethylacetamide (available from FUJIFILM Wako Pure Chemical Corporation), and 15.2 g (96.2 mmol) of chloromethyl styrene ("CMS-P", available from AGC Seimi Chemical Co., Ltd.) were charged, heated and stirred to 50° C. While the reaction temperature was maintained at 50° C., 18.3 g (96.0 mmol) of sodium methoxide (available from Tokyo Chemical Industry Co., Ltd.; 28.3 mass % methanol solution) was added dropwise and stirred for 70 minutes. Furthermore, 1.88 g (9.85 mmol) of sodium methoxide was added dropwise and stirred at 70° C. for 1 hour. Then, 1.37 g (11.9 mmol) of phosphoric acid (available from FUJIFILM Wako Pure Chemical Corporation; concentration: 85.6 mass %) and 2.59 g of N,N-dimethylacetamide were added, and thus the reaction was terminated. At 70 minutes after the reaction termination, suction filtration was performed by using filter paper No. 5A (available from Kiriyama Glass Works Co.) and KIRIYAMA ROHTO SB-60 (available from Kiriyama Glass Works Co.; diameter: 60 mm). In the filtrate, 69.4 g of N,N-dimethylacetamide was added, and then the obtained solution mixture was added dropwise in 182.6 g of pure water to solidify. The filtered solid was washed by pure water and then by methanol. After the obtained solid was washed again with pure water and methanol, the solid was dried under a reduced pressure, and thus 33.8 g of target vinyl compound was obtained. The number average molecular weight of the obtained vinyl compound was 1126, and the weight average molecular weight was 2391.

A cured product was produced in accordance with the following method. Furthermore, the glass transition temperature and the dielectric properties of the obtained cured product were measured and are shown in Table 1.

Production of Cured Product

A cured product was produced by placing the vinyl compound obtained as described above in a mold having a 100 mm length and a 30 mm width and kept in a vacuum press at 200° C. for one and a half hours.

Used instrument: Five step press VH2-1630, available from Kitagawa Seiki Co., Ltd.

Measurement of Glass Transition Temperature of Cured Product

For the glass transition temperature of the cured product, dynamic viscoelastic measurement was performed for a sample having a width of 5 mm and a length of 40 mm cut from the obtained cured product, and the obtained peak temperature of dynamic elastic modulus was used as the glass transition temperature. The melting point was expressed in units of ° C.

Used instrument: DMS6100, EXSTAR6000, available from Seiko Instruments Inc.

Temperature increase rate: 5° C./min

Frequency: sine wave, 10 Hz

Measurement of Dielectric Properties of Cured Product

The dielectric constant and the dielectric loss tangent of the cured product was measured at 10 GHz by a cavity resonance perturbation method for a sample having a thickness of 1 mm, a width of 0.8 mm, and a length of 100 mm cut from the obtained cured product. Furthermore, to evaluate thermal oxidation deterioration resistance, the dielectric constant and the dielectric loss tangent were measured at 10 GHz after the sample cut from the cured product was heated at 200° C. for 1 hour in the air. The dielectric loss tangent change percentage was calculated based on the following equation.

Dielectric loss tangent change percentage (%)=((dielectric loss tangent after heating/dielectric loss tangent before heating)−1)×100(%)

Used instrument: 8722ES Network Analyzer, available from Agilent

Example 2

By performing the reaction and purification in the same manner as in Example 1 except for using 30.7 g (82.4 mmol in terms of the number of moles of hydroxy group) of 2,6-xylenol-modified xylene resin obtained in Synthesis Example 2 in place of 30.2 g of the p-tert-butylphenol-modified xylene resin in Example 1, changing the charged amount of the N,N-dimethylacetamide from 120.6 g to 122.6 g, changing the charged amount of chloromethyl styrene from 15.2 g to 14.4 g (90.8 mmol), changing the charged amount of sodium methoxide from 18.3 g to 17.7 g (92.9 mmol), changing the charged amount of the additional sodium methoxide from 1.88 g to 1.64 g (8.59 mmol), changing the charged amount of the phosphoric acid from 1.37 g to 1.19 g (10.4 mmol), and changing the charged amount of the additional N,N-dimethylacetamide from 2.59 g to 2.23 g, 37.5 g of target vinyl compound was obtained. The number average molecular weight of the obtained vinyl compound was 975, and the weight average molecular weight was 2217. A cured product was produced in accordance with the curing conditions described above.

In the same manner as in Example 1, the glass transition temperature and the dielectric properties of the cured product were measured and are shown in Table 1.

Example 3

In a reaction vessel equipped with a stirring apparatus, a thermometer, and a reflux condenser, 26.7 g (92.4 mmol in terms of the number of moles of hydroxy group) of 2,6-xylenol-modified xylene resin obtained in Synthesis Example 3, 185.1 g of toluene (available from FUJIFILM Wako Pure Chemical Corporation), and 27.2 g (327 mmol) of aqueous sodium hydroxide solution (available from Kanto Chemical Co., Inc.; concentration: 48 mass %) were charged, heated and stirred to 70° C. While the reaction temperature was maintained at 70° C., 8.63 g (17.7 mmol) of tetrabutylammonium bromide (available from Lion Akzo Co., Ltd.; concentration: 66 mass %) and 14.8 g (92.8 mmol) of chloromethylstyrene ("CMS-P", available from AGC Seimi Chemical Co., Ltd.) were added and stirred for 170 minutes. An organic phase and an aqueous phase were separated, and the organic phase was washed with 1.4 mass % aqueous sulfuric acid solution and then wane water at 70° C. for four times. After the obtained solution was concentrated, the solution was diluted with 155 g of 2-butanone (available from FUJIFILM Wako Pure Chemical Corporation) and added dropwise in methanol to solidify. The filtered solid was washed with pure water and then methanol, and then washed again with pure water and methanol. The solid was dried under a reduced pressure, and thus 29.8 g of target vinyl compound was obtained. The number average molecular weight of the obtained vinyl compound was 1134, and the weight average molecular weight was 3363. A cured product was produced in accordance with the curing conditions described above.

In the same manner as in Example 1, the glass transition temperature and the dielectric properties of the cured product were measured and are shown in Table 1.

TABLE 1

|  | | Example 1 | Example 2 | Example 3 |
|---|---|---|---|---|
| Phenols | | p-tert-Butylphenol | 2,6-Xylenol | 2,6-Xylenol |
| Raw material resin | | Synthesis Example 1 | Synthesis Example 2 | Synthesis Example 3 |
| Raw material resin hydroxy group equivalent (g/eq) | | 346 | 373 | 289 |
| Cured product | Glass transition temperature (° C.) | 185 | 181 | 190 |
|  | Dielectric constant | 2.42 | 2.47 | 2.48 |
|  | Dielectric loss tangent | 0.0028 | 0.0032 | 0.0028 |
|  | Dielectric loss tangent after 200° C. for 1 hr | 0.0034 | 0.0037 | 0.0034 |
|  | Dielectric loss tangent change percentage (%) | 21.4 | 15.6 | 21.4 |

The invention claimed is:

1. A resin comprising constituent units described in Group (1):

Group (1)

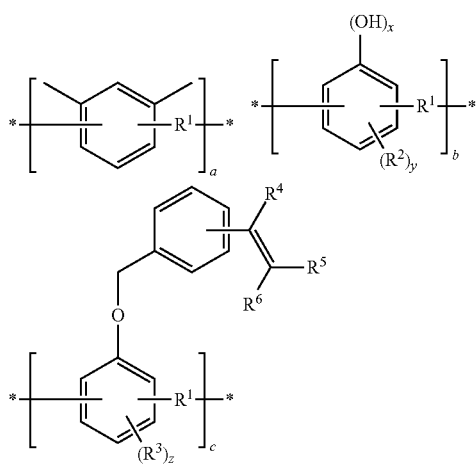

where $R^1$ each independently represent a methylene group, a methylene oxy group, a methylene oxy methylene group, or an oxy methylene group, $R^2$ and $R^3$ each independently represent a halogen atom, an alkyl group having from 1 to 10 carbons, a halogenated alkyl group having from 1 to 10 carbons, a hydroxy alkyl group having from 1 to 10 carbons, or an aryl group having from 6 to 12 carbons, $R^4$, $R^5$, and $R^6$ each independently represent a hydrogen atom, a halogen atom, an alkyl group having from 1 to 10 carbons, a halogenated alkyl group having from 1 to 10 carbons, a hydroxy group, a hydroxy alkyl group having from 1 to 10 carbons, or an aryl group having from 6 to 12 carbons, x represents 0 or 1, and y and z each independently represent a number of 0 to 3, a, b, and c each independently represent a molar ratio of the constituent units, a represents a number of 1 or greater, b represents a number of 0 or greater, and c represents a number of 1 or greater, $R^1$ may bond each other to form a cross-linking structure, and * represents a bonding position with another constituent unit or a terminal group.

2. The resin according to claim 1, wherein, in Group (1), $R^4$, $R^5$, and $R^6$ each independently represent a hydrogen atom.

3. The resin according to claim 1, wherein, in Group (1), $R^2$ and $R^3$ each independently represent an alkyl group having from 1 to 10 carbons.

4. The resin according to claim 1, wherein, in Group (1), $R^2$ and $R^3$ each independently represent an alkyl group having from 1 to 5 carbons.

5. The resin according to claim 1, wherein $0.2 \leq a/(b+c) \leq 5$ is satisfied in Group (1).

6. The resin according to claim 1, wherein the constituent units described in Group (1) contain at least one type selected from the group consisting of constituent units described in Group (1-1), constituent units described in Group (1-2), and constituent units described in Group (1-3), Group (1-1)

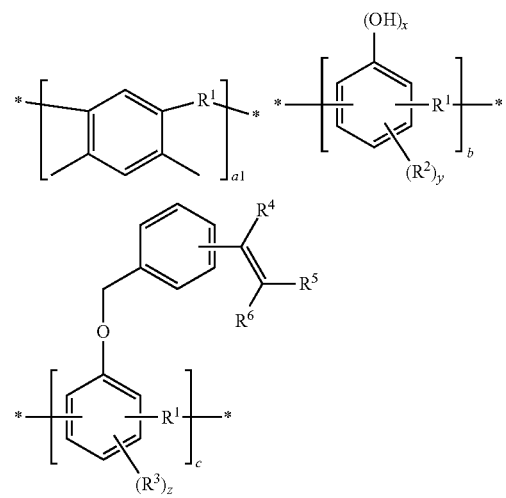

where $R^1$, $R^2$, $R^3$, $R^4$, $R^5$, $R^6$, x, y, z, a1, b, and c are respectively synonymous with $R^1$, $R^2$, $R^3$, $R^4$, $R^5$, $R^6$, x, y, z, a, b, and c of Group (1), and * represents a bonding position with another constituent unit or a terminal group, Group (1-2)

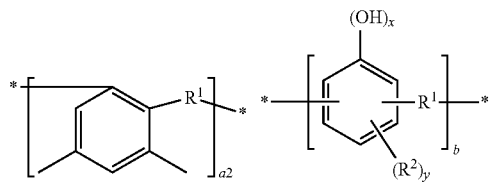

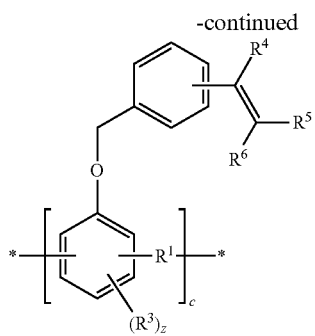

where $R^1$, $R^2$, $R^3$, $R^4$, $R^5$, $R^6$, x, y, z, a2, b, and c are respectively synonymous with $R^1$, $R^2$, $R^3$, $R^4$, $R^5$, $R^6$, x, y, z, a, b, and c of Group (1), and * represents a bonding position with another constituent unit or a terminal group, Group (1-3)

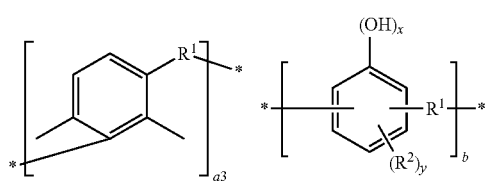

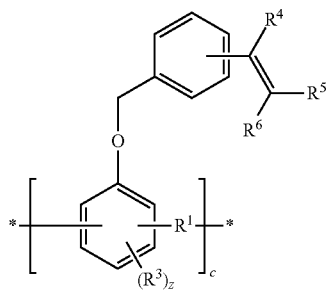

where $R^1$, $R^2$, $R^3$, $R^4$, $R^5$, $R^6$, x, y, z, a3, b, and c are respectively synonymous with $R^1$, $R^2$, $R^3$, $R^4$, $R^5$, $R^6$, x, y, z, a, b, and c of Group (1), and * represents a bonding position with another constituent unit or a terminal group.

7. The resin according to claim 6, wherein the constituent units described in Group (1) contain the constituent units described in Group (1-1).

8. The resin according to claim 1, wherein a number average molecular weight (Mn) is from 500 to 4000, and a weight average molecular weight (Mw) is from 500 to 7000.

9. The resin according to claim 1, wherein a terminal group of the resin is selected from the group consisting of a hydrogen atom, a hydroxy group, and a hydroxymethyl group.

10. A resin being a reaction product of a resin containing constituent units described in Group (2) and a compound represented by Formula (3), Group (2)

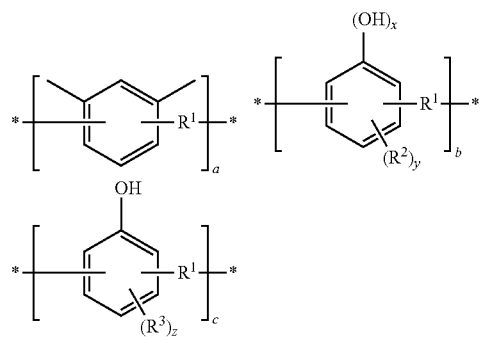

where $R^1$ each independently represent a methylene group, a methylene oxy group, a methylene oxy methylene group, or an oxy methylene group, $R^2$ and $R^3$ each independently represent a halogen atom, an alkyl group having from 1 to 10 carbons, a halogenated alkyl group having from 1 to 10 carbons, a hydroxy alkyl group having from 1 to 10 carbons, or an aryl group having from 6 to 12 carbons, x represents 0 or 1, and y and z each independently represent a number of 0 to 3, a, b, and c each independently represent a molar ratio of the constituent units, a represents a number of 1 or greater, b represents a number of 0 or greater, and c represents a number of 1 or greater, $R^1$ may bond each other to form a crosslinking structure, and * represents a bonding position with another constituent unit or a terminal group, Formula (3)

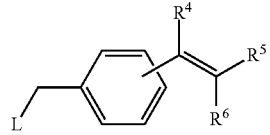

where $R^4$, $R^5$, and $R^6$ each independently represent a hydrogen atom, a halogen atom, an alkyl group having from 1 to 10 carbons, a halogenated alkyl group having from 1 to 10 carbons, a hydroxy group, a hydroxy alkyl group having from 1 to 10 carbons, or an aryl group having from 6 to 12 carbons, and L represents a halogen atom.

11. The resin according to claim 10, wherein a hydroxy group equivalent of the resin containing the constituent units described in Group (2) is from 200 to 400 g/eq.

12. A method for producing a resin, the method comprising reacting a resin containing constituent units described in Group (2) and a compound represented by Formula (3) in the presence of a basic compound, Group (2)

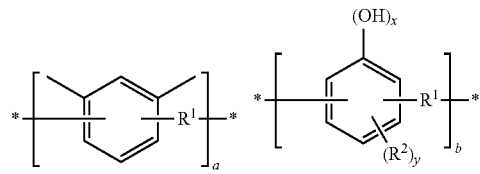

-continued

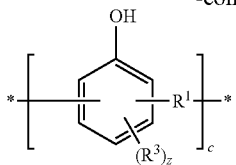

where $R^1$ each independently represent a methylene group, a methylene oxy group, a methylene oxy methylene group, or an oxy methylene group, $R^2$ and $R^3$ each independently represent a halogen atom, an alkyl group having from 1 to 10 carbons, a halogenated alkyl group having from 1 to 10 carbons, a hydroxy alkyl group having from 1 to 10 carbons, or an aryl group having from 6 to 12 carbons, x represents 0 or 1, and y and z each independently represent a number of 0 to 3, a, b, and c each independently represent a molar ratio of the constituent units, a represents a number of 1 or greater, b represents a number of 0 or greater, and c represents a number of 1 or greater, $R^1$ may bond each other to form a crosslinking structure, and * represents a bonding position with another constituent unit or a terminal group, Formula (3)

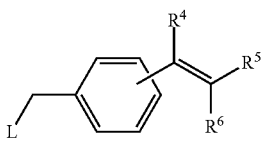

where $R^4$, $R^5$, and $R^6$ each independently represent a hydrogen atom, a halogen atom, an alkyl group having from 1 to 10 carbons, a halogenated alkyl group having from 1 to 10 carbons, a hydroxy group, a hydroxy alkyl group having from 1 to 10 carbons, or an aryl group having from 6 to 12 carbons, and L represents a halogen atom.

13. The method according to claim 12, wherein, in Formula (3), $R^4$, $R^5$, and $R^6$ are each a hydrogen atom, and L is a chlorine atom.

14. The method according to claim 12, wherein, in Group (2), $R^2$ and $R^3$ each independently represent an alkyl group having from 1 to 10 carbons.

15. The method according to claim 12, wherein, in Group (2), $R^2$ and $R^3$ each independently represent an alkyl group having from 1 to 5 carbons.

16. The method according to claim 12, wherein $0.2 \leq a/(b+c) \leq 5$ is satisfied in Group (2).

17. The method according to claim 12, wherein the constituent units described in Group (2) contain at least one type of constituent units described in Group (2-1), constituent units described in Group (2-2), or constituent units described in Group (2-3), Group (2-1)

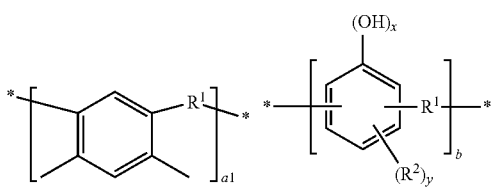

-continued

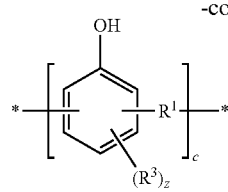

where $R^1$, $R^2$, $R^3$, x, y, z, a1, b, and c are respectively synonymous with $R^1$, $R^2$, $R^3$, x, y, z, a, b, and c of Group (2), and * represents a bonding position with another constituent unit or a terminal group, Group (2-2)

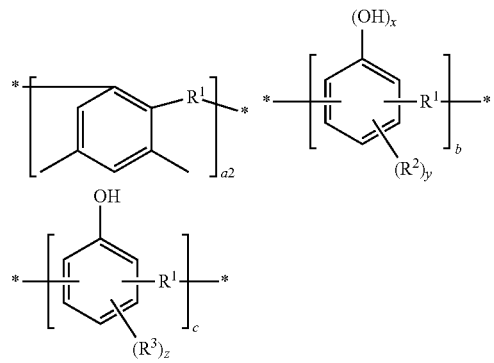

where $R^1$, $R^2$, $R^3$, x, y, z, a2, b, and c are respectively synonymous with $R^1$, $R^2$, $R^3$, x, y, z, a, b, and c of Group (2), and * represents a bonding position with another constituent unit or a terminal group, and Group (2-3)

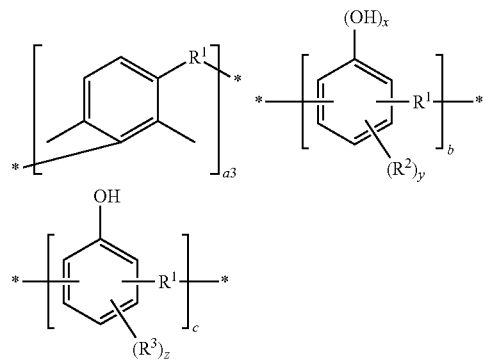

where $R^1$, $R^2$, $R^3$, x, y, z, a3, b, and c are respectively synonymous with $R^1$, $R^2$, $R^3$, x, y, z, a, b, and c of Group (2), and * represents a bonding position with another constituent unit or a terminal group.

18. The method according to claim 17, wherein the constituent units described in Group (2) contains the constituent units described in Group (2-1).

19. The method according to claim 12, wherein a hydroxy group equivalent of the resin containing the constituent units described in Group (2) is from 200 to 400 g/eq.

20. The method according to claim 12, wherein a number average molecular weight Mn of the resin containing the constituent units described in Group (2) is from 400 to 2500, and a weight average molecular weight Mw is from 400 to 5000.

21. The method according to claim 12, wherein a terminal group of the resin containing the constituent units described in Group (2) is selected from the group consisting of a hydrogen atom, a hydroxy group, and a hydroxymethyl group.

22. The method according to claim 12, wherein the basic compound contains at least one type selected from the group consisting of alkali metal alkoxides and alkali metal hydroxides.

23. The method according to claim 12, wherein the produced resin is a resin (A),
wherein the resin (A) comprises constituent units described in Group (1):

Group (1)

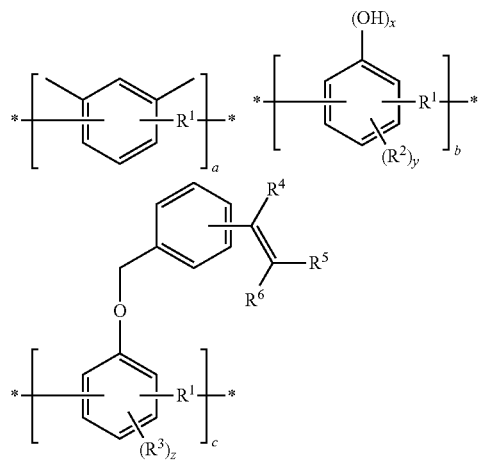

where $R^1$ each independently represent a methylene group, a methylene oxy group, a methylene oxy methylene group, or an oxy methylene group, $R^2$ and $R^3$ each independently represent a halogen atom, an alkyl group having from 1 to 10 carbons, a halogenated alkyl group having from 1 to 10 carbons, a hydroxy alkyl group having from 1 to 10 carbons, or an aryl group having from 6 to 12 carbons, $R^4$, $R^5$, and $R^6$ each independently represent a hydrogen atom, a halogen atom, an alkyl group having from 1 to 10 carbons, a halogenated alkyl group having from 1 to 10 carbons, a hydroxy group, a hydroxy alkyl group having from 1 to 10 carbons, or an aryl group having from 6 to 12 carbons, x represents 0 or 1, and y and z each independently represent a number of 0 to 3, a, b, and c each independently represent a molar ratio of the constituent units, a represents a number of 1 or greater, b represents a number of 0 or greater, and c represents a number of 1 or greater, $R^1$ may bond each other to form a cross-linking structure, and * represents a bonding position with another constituent unit or a terminal group.

24. A curable resin composition comprising a resin according to claim 1.

25. The curable resin composition according to claim 24, further comprising a thermosetting compound besides a resin (A),
wherein the resin (A) comprises constituent units described in Group (1):

Group (1)

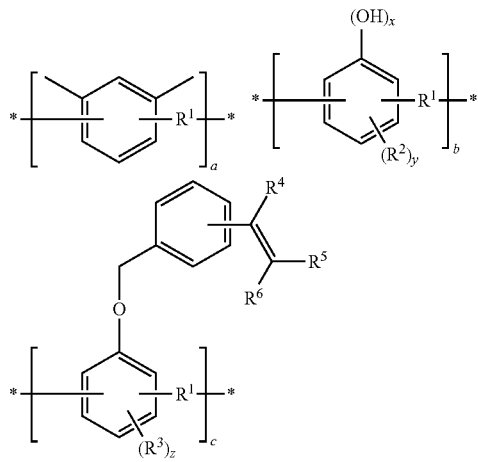

where $R^1$ each independently represent a methylene group, a methylene oxy group, a methylene oxy methylene group, or an oxy methylene group, $R^2$ and $R^3$ each independently represent a halogen atom, an alkyl group having from 1 to 10 carbons, a halogenated alkyl group having from 1 to 10 carbons, a hydroxy alkyl group having from 1 to 10 carbons, or an aryl group having from 6 to 12 carbons, $R^4$, $R^5$, and $R^6$ each independently represent a hydrogen atom, a halogen atom, an alkyl group having from 1 to 10 carbons, a halogenated alkyl group having from 1 to 10 carbons, a hydroxy group, a hydroxy alkyl group having from 1 to 10 carbons, or an aryl group having from 6 to 12 carbons, x represents 0 or 1, and y and z each independently represent a number of 0 to 3, a, b, and c each independently represent a molar ratio of the constituent units, a represents a number of 1 or greater, b represents a number of 0 or greater, and c represents a number of 1 or greater, $R^1$ may bond each other to form a cross-linking structure, and * represents a bonding position with another constituent unit or a terminal group.

26. The curable resin composition according to claim 25, wherein the thermosetting compound contains at least one type selected from the group consisting of compounds having a carbon-carbon unsaturated bonding group and epoxy resins other than the resin (A).

27. A cured product of a curable resin composition according to claim 24.

* * * * *